(12) United States Patent
Struthers et al.

(10) Patent No.: US 8,245,453 B2
(45) Date of Patent: *Aug. 21, 2012

(54) FLUSH MOUNTING APPARATUS AND METHODS USING COMPONENT COVER

(75) Inventors: Scott Struthers, San Clemente, CA (US); Ray Call, Mission Viejo, CA (US)

(73) Assignee: Dana Innovatoions, San Clemente, CA (US)

( * ) Notice: Subject to any disclaimer, the term of this patent is extended or adjusted under 35 U.S.C. 154(b) by 721 days.

This patent is subject to a terminal disclaimer.

(21) Appl. No.: 12/356,416

(22) Filed: Jan. 20, 2009

(65) Prior Publication Data

US 2009/0193724 A1    Aug. 6, 2009

Related U.S. Application Data

(63) Continuation-in-part of application No. 12/202,870, filed on Sep. 2, 2008, which is a continuation-in-part of application No. 11/954,667, filed on Dec. 12, 2007, now Pat. No. 7,461,483, which is a continuation-in-part of application No. 11/566,365, filed on Dec. 4, 2006, now Pat. No. 7,699,138.

(60) Provisional application No. 60/950,237, filed on Jul. 17, 2007, provisional application No. 60/825,162, filed on Sep. 11, 2006.

(51) Int. Cl.
*E04F 19/00* (2006.01)

(52) U.S. Cl. .............................. 52/27; 52/204.1; 52/213

(58) Field of Classification Search ........... 52/27, 204.1, 52/204.2, 206, 211, 213
See application file for complete search history.

(56) References Cited

U.S. PATENT DOCUMENTS

| 4,105,274 | A | 8/1978 | Casey |
| 4,890,418 | A | 1/1990 | Sachs |
| 5,292,092 | A | 3/1994 | Curtis |
| 6,062,704 | A | 5/2000 | Holder |
| 6,956,169 | B1 | 10/2005 | Shotey |
| 7,292,702 | B2 | 11/2007 | Hagman |

*Primary Examiner* — Basil Katcheves
(74) *Attorney, Agent, or Firm* — Fish & Associates, PC

(57) ABSTRACT

A panel with a bracket is used to install a component to a wallboard. The panel is inserted into an opening to a wallboard, and the junction between the panel and the wallboard is taped and spackled so that the wallboard and panel appear to be a single object. When the component is fully coupled to the bracket, the front of the component is slightly recessed from the front of the panel. A component cover could then be inserted into the newly created recess so that the component appears to be completely flush with the wallboard.

16 Claims, 13 Drawing Sheets

FLUSH MOUNTING APPARATUS AND METHODS USING COMPONENT COVER

This application is a continuation-in-part of non-provisional application Ser. No. 12/202,870 filed Sep. 2, 2008. Ser. No. 12/202,870 is a continuation-in-part of non-provisional application Ser. No. 11/954,667 filed Dec. 12, 2007. Ser. No. 11/954,667 is a continuation-in-part of non-provisional application Ser. No. 11/566,365 filed Dec. 4, 2006, and Ser. No. 11/954,667 also claims priority to (1) provisional application Ser. No. 60/950,237 filed Jul. 17, 2007 and (2) International application Ser. No. PCT/US07/16404 filed Jul. 19, 2007. Ser. No. 11/566,365 claims priority to provisional application Ser. No. 60/825,162 filed Sep. 11, 2006. PCT/US07/16404 claims priority to (1) non-provisional application Ser. No. 11/548,381 filed Oct. 11, 2006, (2) provisional application 60/825,162 filed Sep. 11, 2006, and (3) provisional application 60/950,237 filed Jul. 17, 2007. All prior applications are incorporated by reference in their entirety.

FIELD OF THE INVENTION

The field of the invention is component covers for wall mounts.

BACKGROUND

Plasma screens, speakers, light switches, electrical outlets, recessed lighting, junction boxes and other components can be mounted to walls or ceilings. Components are generally mounted in a bracket and have a front external cover that conceals a front of the component. For example, U.S. Pat. No. 6,956,169 to Shotey teaches an outlet box with a hinged component cover that covers the front of the box. Shotey's component cover, however, requires the installer to install the outlet box along a support strut, such that the component cover extends outward from the front of the wallboard, preventing a flush-mounted appearance. Shotey and all other extrinsic materials identified herein are incorporated by reference in their entirety. Where a definition or use of a term in an incorporated reference is inconsistent or contrary to the definition of that term provided herein, the definition of that term provided herein applies and the definition of that term in the reference does not apply.

U.S. Pat. No. 5,292,092 to Curtis teaches a wall-mounted speaker system that clamps a speaker directly to a wallboard using the component cover and a clamp bar. While Curtis allows a speaker to be clamped in any location along the surface of a wallboard, wallboards generally can't support the weight of heavy speakers over time. Additionally, the component cover of Curtis still extends outward from the front of the wallboard, here again preventing a flush-mounted appearance.

U.S. Pat. No. 7,292,702 to Hagman teaches a wall-mounted speaker that is hidden behind a wallboard. The speaker is attached to opposing struts in a wall, and a thin, opaque component cover is hammered over the speaker and the entire assembly is spackled over. Hagman can be mounted between any two studs in a wallboard, gives a completely flush-mounted appearance, and even hides the speaker from view completely. Hagman, however, does not allow the component cover to be easily removed after spackling, and does not provide an easy way to remove the speaker if it needs to be maintained. If Hagman's speaker needs maintenance, the entire assembly needs to be ripped out of the wall and reinstalled from scratch.

Thus, there is still a need in the art for improved wall-mounted systems with removable, flush-mounted component covers.

SUMMARY OF THE INVENTION

The present invention provides apparatus and methods in which a component cover for a mounted component in a panel is installed flush with the front surface wallboard by providing a recess for the component cover. The edges of the panel are approximated with the edges of a cutout in the wallboard, and the junction between the panel and the wallboard is taped and spackled so that it appears to a casual observer that the component is flush-mounted to the wallboard.

In ordinary parlance, a wallboard is a building board made for surfacing rather than for insulating ceilings and walls. Wallboards are often made into large rigid sheets that are fastened to the frame of a building to provide a surface finish. However, as used herein, the term "wallboard" should be construed broadly to mean any sort of mechanical barrier for surfacing ceilings or walls, including doors. Wallboards can be made of any suitable material, including for example plywood, plaster, wood, wood pulp, or gypsum. As used herein, the term "wallboard" excludes floors.

In preferred embodiments, the component cover is locked within the recess using a locking mechanism that prevents the cover from being dislodged from its location in front of the component. Suitable locking mechanisms include matching magnets, magnet attractors, indents, detents, push-push latch, compressible material, sliding bolts, recesses, pivoting latches, latch locks, screws and threaded holes. Matching parts of a locking mechanism are two parts that mate with one another to prevent the component from being removed from the receiver. Preferably, the locking mechanism comprises several matching magnets and magnet attractors on the component cover and a device abutting the recess, for example the panel, a bracket, or the component itself. A magnet attractor is defined herein as any material that has a positive magnetic susceptibility. Contemplated magnet attractors include iron, lodestone, steel, nickel, cobalt, and magnetite. A magnet attractor is attracted to a magnet when placed in close proximity to the magnet, which means that either the magnet is pulled towards the magnet attractor or vice versa. Preferred matching magnets and magnet attractors pull the component into the receiver without any additional forces when the magnets are located within 1, 2, or even 5 inches away from one another. (2.54, 5.08, and 12.7 cm)

Whatever the locking mechanism, the locking mechanism is preferably not viewable from the front of the component. This could be accomplished by physically placing or sliding a cover over the locking mechanism, but is more preferably accomplished by placing the locking mechanism on any side but the front side of the component cover. A key could be used engage the locking mechanism, however, the locking mechanism preferably automatically engages as the component cover is inserted into the recess so that a user looking at the front of the component does not see how the component cover is locked within the recess.

An electronic remote could unlock the locking mechanism, for example a radio frequency transmitter or a passive RFID tag, but the key to unlock the component cover is preferably a low tech solution. For example, a magnet could slide a bolt or latch to the side, or a screwdriver could unscrew a bolt running through the component and the receiver. A user could also simply overpower the locking mechanism by pulling the component from the receiver using a gripping surface, for example a handle, outcropping, or a loop. Where the front surface of the component cover is without a gripping surface, a vacuum or magnetic force could be used. Vacuum grippers could provide a powerful vacuum force by combining a lever with a suction cup, and electromagnets or lodestones could provide a powerful magnetic force.

The recess is generally formed by disposing the component into an opening in the panel, such that the front side of the component is recessed from the front side of the panel. This forms a "cover recess" that the component cover can be placed within, so that the front side of the component cover is substantially flush with the front side of the panel. As used herein, "substantially flush" means that the front surface of the component cover and the front surface of the panel are even with one another to within a 2 mm tolerance. Preferably, the component cover and the panel are even with one another within a 1 mm or ½ mm tolerance.

The opening in the panel preferably extends from a front side of the panel to a back side of the panel. The "front side" of the panel is defined herein as the side of the panel that is facing outwards when the panel is installed to a wallboard. The front side includes any spackle that may need to be spread over the front of the panel up to the spackling rim at the edge of the bracket. It is contemplated that the front surface area of the panel (i.e. the remaining area around the opening) will be greater than 25, 50, or even 100 square inches to provide enough support to hold the component, but less than about 500 square inches. If the front surface area of the panel is much less than about 25 square inches, then the panel would likely be too weak because the opening is so large relative to the size of the panel. If the front surface area is greater than about 500 square inches, then the panel is likely too large to be practicable.

The "back side" of the panel is defined herein as the side of the panel that is directly opposite to the front side. As an opening extends from a front side of the panel to the back side, the opening necessarily links a front side of the wallboard to the back side of the wallboard when installed. As used herein, the term "installing a panel to a wallboard" should be interpreted in a sufficiently broad manner as to include embodiments of FIGS. 16A-16E and 17A-17C. Moreover, even if a panel of those figures were separated from the surrounding wallboard by a fiberboard or other spacer, the panel would still be considered to be "installed to the wallboard" so long as the junctions between the panel and the spacer, and the spacer and the wallboard, are plastered or otherwise finished so that the panel appears to be continuous with the wallboard.

When the component cover is placed within the "cover recess" formed in the panel, the cover covers at least a portion of the front of the component. Preferably the component cover covers the entire surface of the component so that it can not be seen from a front of the wallboard. The component cover does not need to directly touch the component and could have an object interposed between the component cover and the component. For example, a static-free sheet could be interposed between the two in order to prevent scratching.

Panels are typically installed into the wallboard by first approximating the edges of the panel with the edges of the wallboard. "Approximating" is defined herein to mean bringing the edges near or towards one another so that the junction or gap between the edges is less than 10 mm (0.394 in), more preferably less than 5 mm (0.197 in), or most preferably less than 2 mm (0.079 in). If the junction or gap between the edges is larger, a spacer can be attached to the edge of the panel before installation, or one or more shims can be installed into the junction. The junction can then be concealed using a suitable construction method, for example taping or plastering over the junction. Providing a pre-fabricated panel designed to accept specific components greatly facilitates installation by eliminating the need for on-site precision measurements.

The panel is preferably coupled to a support stud behind the wallboard. A "support stud" is defined herein as a stud or a beam in a wall or a ceiling that acts as a reinforcement to the structural integrity of the room. A "support stud behind a wallboard" is defined herein as a stud that is opposite the front side of the panel when the panel is mounted in the wallboard. Typically wallboards are made of plaster and drywall, and are not strong enough to support the weight of some of the heavier components.

Various objects, features, aspects and advantages of the present invention will become more apparent from the following detailed description of preferred embodiments of the invention, along with the accompanying drawings in which like numerals represent like components.

DETAILED DESCRIPTION

Figure 1:
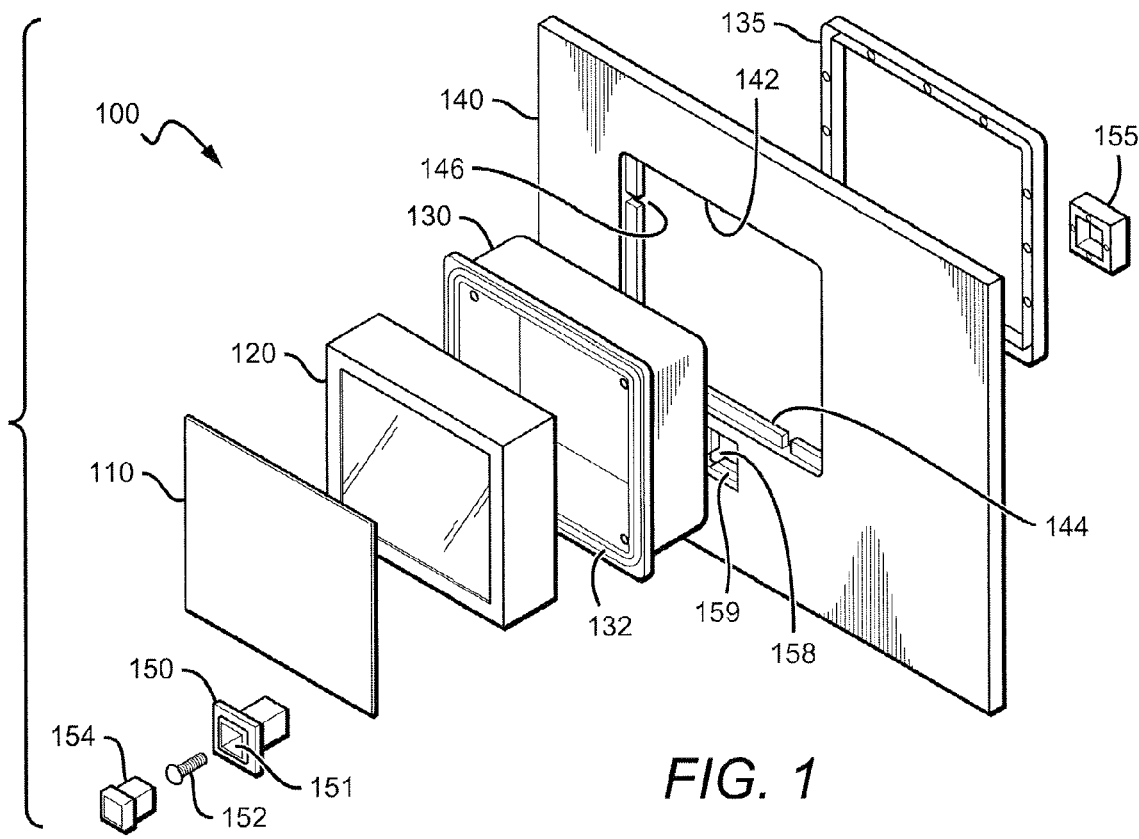
FIG. 1 is an exploded view of a panel, bracket, component, component cover, and logo according to one embodiment.

In FIG. 1, a panel 140 is used to mount a component 120 to a wallboard (not shown). Generally, panel 140 has an opening 142 and recessed projections 144. Front bracket 130 and back bracket 131 clamp onto recessed projections 144, and then component 120 could be placed within the completed bracket. Lastly, component cover 110 is placed over component 120 to cover at least a portion of the front of component 120.

Panel 140 is a piece of gypsum board, wood, plastic, or other material (or combination of materials) sufficiently strong to support a speaker or other desired component between two studs of a wall, or joists or other supports in a ceiling. Where plywood is used as the panel material, for example, the panel might be as thin as ¼" (6.31 mm), but would more preferably measure at least ½" (12.7 mm) or ⅜" (19.01 mm). Preferred materials include wallboard, Medium Density Fiberboard (MDF), High Density Fiberboard (MDF), Acrylonitrile Butadiene Styrene (ABS), and other materials that closely match various characteristics of drywall. Multiple materials could be used, for example mixed in with one another, alternating, layered on top of one another, or a combination. Preferably, the material has equal moisture absorption and coefficient of thermal expansion as the surrounding wallboard, while having greater durability and strength for attaching heavy components directly to the panel. For example QuietRock® 121 could be a paneling material used where the wallboard comprises drywall.

Panel 140 is generally about twenty inches (about 10 cm) to twenty-four inches (about 60 cm) wide, but panel 140 could have any other suitable dimensions. Narrower panels are also contemplated, although they would likely not have a sufficient width to extend between wall studs or ceiling joists. It is preferable for the panel 140 to have a width of at least six inches (11.24 cm) or twelve inches (30.48 cm) greater than the spacing between studs, which allows the installer considerably greater flexibility in positioning the panel on the wall. Lateral wings (not shown) could be attached to the perimeter of panel 140 to extend the width for installations where the studs are spread apart at a greater distance from each other than normal. While panel 140 is shown as a substantially planar apparatus, panel 140 can be concave, convex, or any other shape to either match the shape of the wallboard, or to introduce a non-planar surface to the wallboard.

Opening 142 extends from a front side of panel 140 to a back side of panel 140. Opening 142 can be of any suitable shape and size. Preferred openings are rectangular to accommodate common rectangular components, for example light switches, wall outlets, speaker volume controls, and home security systems. However, the openings could alternatively be oval or circular or any other desired shape. The area of the opening is generally dependent on the size of the component, and can range up to 80 in$^2$ or larger. Especially preferred openings have an area of at least 20 in$^2$, 40 in$^2$, 60 in$^2$, and even 80 in$^2$. Nevertheless, for stability, it is contemplated that the panel have openings with a length that is no more than half or one third the length of the panel.

Unless a contrary intent is apparent from the context, all ranges recited herein are inclusive of their endpoints, and open-ended ranges should be interpreted to include only commercially practical values.

In some cases it may be desirable for a given panel to include multiple openings for multiple components. Viewed from the perspective of a wall panel, openings with varying height could be aligned along their top or bottom edges, aligned along a centerline, or could be arranged in a staircase fashion with a top edge aligned to a bottom edge. Openings could be cut at a job site or elsewhere by an installer, but are more conveniently precut (or molded to include the opening) at the manufacturer. It is possible for a panel to have punch out openings or perhaps cutout lines to facilitate selection of the position of the opening at the job site, but those options are currently disfavored relative to a manufactured pre-cut or molded opening and a relatively large panel.

Recessed projection 144 projects into opening 142, and is also slightly recessed from the front side of the panel. Recessed projection preferably extends more than 1 cm, 2 cm, or 4 cm into the opening but can extend a lesser distance depending on the strength of the panel. Recessed projection is also preferably recessed by about 1 cm from the front side of the panel, allowing ample room for the front bracket to be situated within the opening. Here, recessed projection has screw holes 146 that help front bracket 130 and back bracket 131 clamp onto the recessed projection, although screw holes are not necessary for front bracket and back bracket to clamp onto the recessed projection.

Front bracket 130 has an outer perimeter spackling rim 132 that rests against recessed projection 144 within the recess formed by recessed projection 144. Front bracket 130 has threaded screw holes that are spaced approximately 2 cm from the corners of spackling rim 132 and are approximately 3 cm deep, but can be shaped and configured in other suitable ways. Screws thread through screw holes in rear bracket 131 and into the screw holes in front bracket 130 to "clamp" the front bracket and rear bracket to the recessed projection, holding the bracket in place within the opening. After the bracket is situated, a component 120 can be fitted into bracket 130. While front bracket has a receiving portion that accepts component 120 and rear bracket merely acts as a "rim" that clamps front bracket and rear bracket against the recessed projection, rear bracket could also have a receiving portion that accepts the component without departing from the scope of the invention.

Component 120 is used euphemistically to refer to any suitable component in any category, for example plasma screens, in wall art panels, in wall cabinets, windows, wall outlets, security systems, fuse boxes, light switches, lighting, sprinkler systems, smoke detectors, and so forth. Here, component 120 is represented by a thin wafer that fits within bracket 130.

Component cover 110 covers at least a portion of the front of component 120, and is preferably held in place with a magnetic coupling system that couples the component cover either directly to the component or to the bracket. Component cover 110 preferably also rests inside the recess formed by recessed projection 144 so that the front of component cover 110 is flush with the front of spackling rim 132. While component cover is shown as a substantially rectangular plate, component cover could be shaped and sized in any manner without departing from the scope of the invention.

A logo opening 158 and logo recessed projection 159 are situated below opening 144 so that a logo front bracket 150 and logo rear bracket 155 could couple to recessed projection 159. Logo 154 could then be coupled to bracket 110 using threaded screw 152. Logo 154 is preferably flush with the front of logo spackling rim 151. This way, a logo of a manufacturer could be embedded directly into the panel instead of to the component cover.

Figure 2:
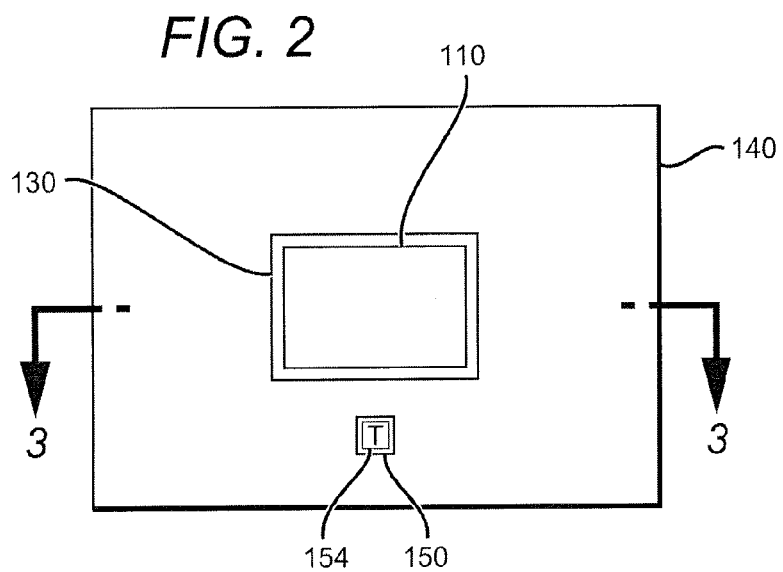
FIG. 2 is a front view of the panel, bracket, component, and component cover of FIG. 1 coupled together

In FIG. 2, the panel, bracket, component, and component cover of FIG. 1 have all been coupled together. While component cover 110 masks the entire component from view, smaller or partial component covers are contemplated that only mask a portion of the component. Such component covers are needed when users need constant access to the component, for example when the component is a speaker or a tough screen of some sort.

Figure 3:
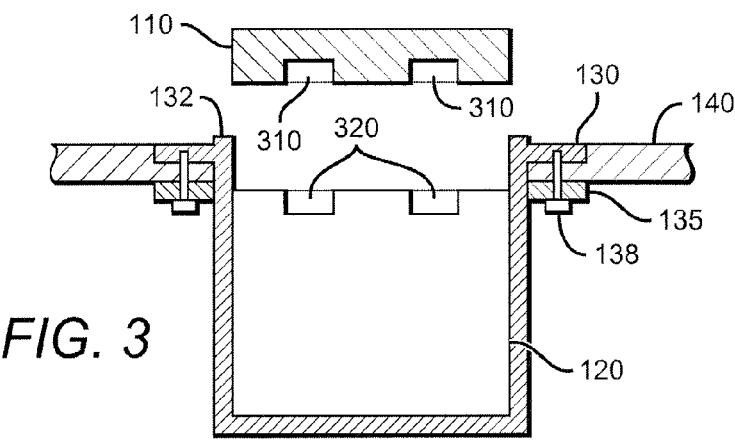
FIG. 3 is a simplified horizontal cross-section of the panel, bracket, component, and component cover of FIG. 2, taken along line 3-3.

In FIG. 3, a horizontal cross-section of constructed panel 140 has front bracket 130 and rear bracket 135 coupled to panel 140 with screw 138. Component cover 110 is locked to component 120 with magnet attractors 310 and magnets 320. Magnets 320 pull component cover 110 into component 120 so that the front portion of component cover 130 is flush with spackling rim 132. While magnets 320 do not have to be particularly strong, magnets 320 are preferably strong enough to pull component cover 110 into the locked position when magnets 320 are less than 5 inches (12.7 cm), 2 inches (5.08 cm), or 1 inch (2.54 cm) from magnet attractors 310. It should be appreciated that magnet attractors 310 could be switched with magnets 320, or could be magnets themselves. Additionally, magnets 320 could be located within the front bracket or within the panel instead of being in the bracket, and do not need to be physically abutting magnet attractors 310 when component cover 110 is mounted. In fact, magnets 320 could be in any suitable location so long as they attract magnet attractors 310 when component cover 110 is placed within the recess.

In a preferred embodiment, magnet attractors 310 are magnets, and magnets 320 are electromagnets. A remote control (not shown) could then reverse the polarity of magnets 320 to "eject" the component cover from the bracket when maintenance needs to be performed. Alternatively, a wire (not shown) could run to the front of component cover 110 and surround magnet attractors 310 so that when a current is applied to the wire, the magnet attractors 310 reverse polarity to "eject" the component cover from the bracket.

Figure 4A:
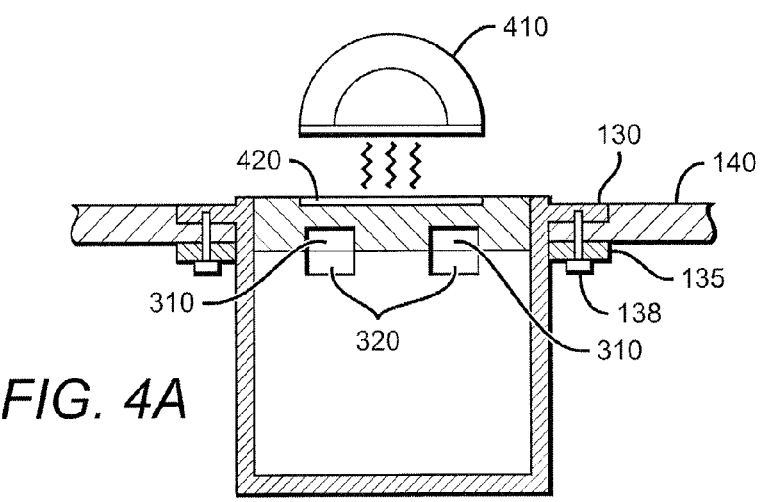
FIGS. 4A-4B show simplified horizontal cross-sections of the panel, bracket, and component of FIG. 3 with a different component cover that is removable using a magnet gripper.
Figure 4B:
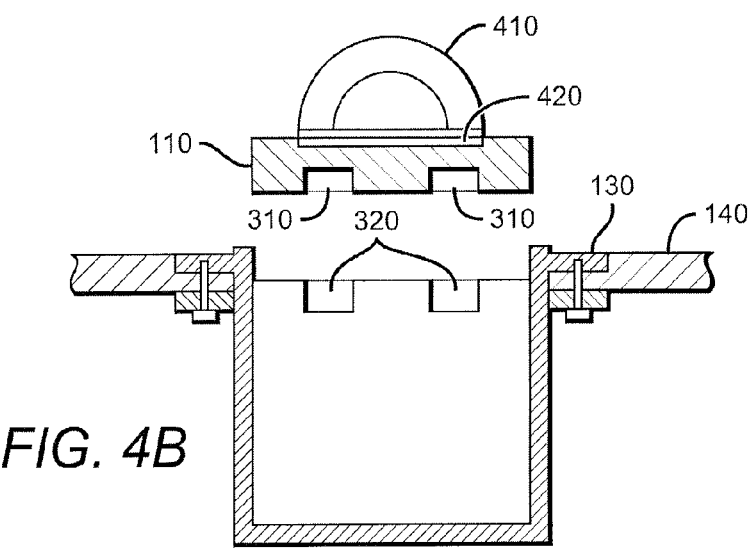

A variety of other methods could be used to "pry" component cover off of bracket 130. For example, in FIGS. 4A and 4B, instead of using an electromagnet of reversed polarities to eject the component from the receiver, a magnet gripper 410 could be used with magnet attractors 310 to overpower the magnetic force between magnet attractor 310 and magnet 320. It should be appreciated that the magnetic force between the magnet gripper and magnet attractors should be much stronger than the magnetic force between the magnet attractor and the magnet in the bracket. It should also be appreciated that if component 130 is an electronic device, that magnet attractors 310 and 420 should be located well aware of any electrical machinery that would be negatively affected by a strong magnetic force. An additional magnet gripper (not shown), or a single magnet gripper with an additional handle, could be used for a user to pull the component out of the receiver with two hands instead of one.

Figure 5A:
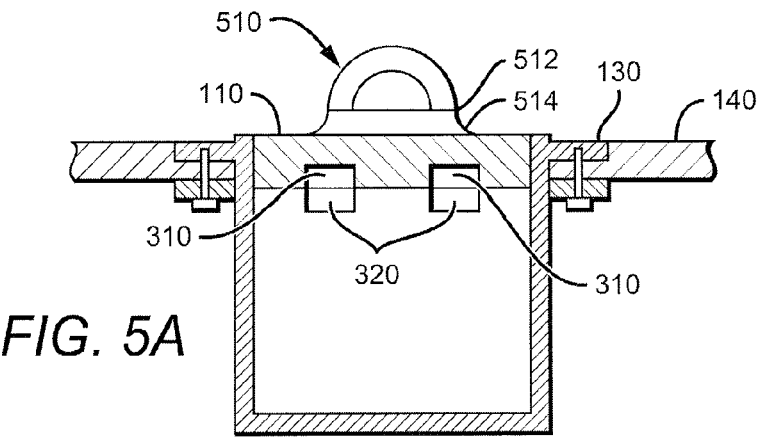
FIGS. 5A-5B show the component cover of FIG. 3 being removed using a vacuum gripper.
Figure 5B:
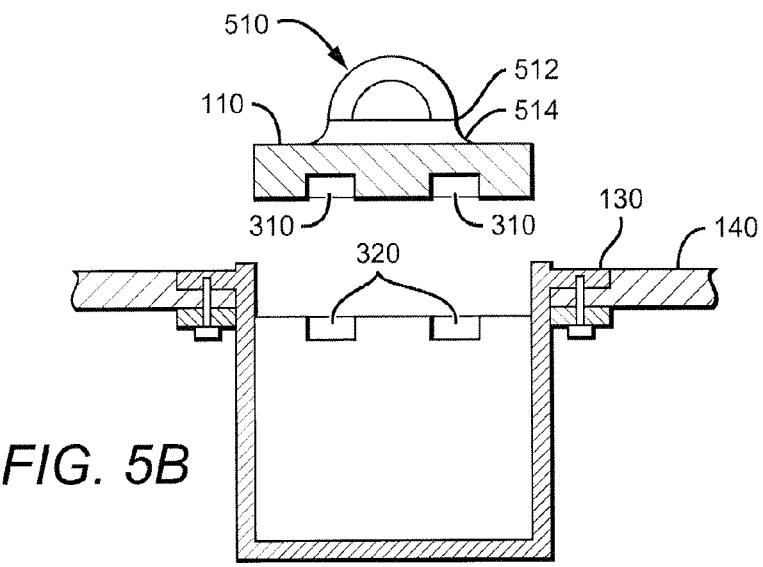

In FIGS. 5A and 5B, a vacuum gripper 510 is used instead of a magnet gripper to overpower the magnetic force between magnet attractor 310 and magnet 320. Vacuum gripper has a lever 512 that is attached to suction cup 514 such that when lever 512 is activated, air is removed from suction cup 514. When lever 512 is pulled while suction cup 514 abuts the flat surface of component 130, the absence of air in suction cup 514 provides a vacuum force that locks vacuum gripper 510 to the front of component 130. From that point, a user can simply pull on vacuum gripper 510 to remove component 130 from receiver 120.

Figure 6:
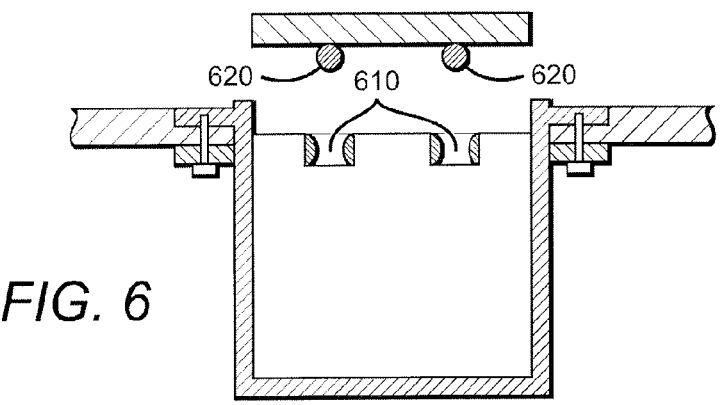
FIG. 6 is a simplified horizontal cross-section of the panel, bracket, and component of FIG. 2, taken along line 3-3, with a different component cover using indents and detents

In FIG. 6, an indent/detent locking mechanism 600 generally comprises indents 610 and detents 620. Indents 610 are sized, spaced, and oriented to mate with detents 620 as component cover 110 is being inserted into bracket 130. Preferably, detents snap into place around indents 610 without locking into place, so that component cover 110 can be pulled out of bracket 130 without damaging the indent/detent mating. Detent 620 could also be a push-push latch, so that component cover 110 could be disengaged merely by pressing on the front of component cover 110.

Figure 7A:
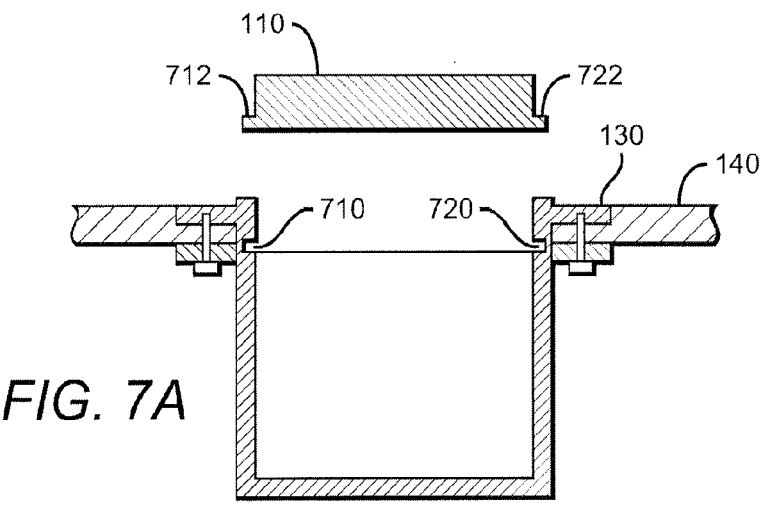
FIGS. 7A-7C show simplified horizontal cross-sections of the panel, bracket, and component of FIG. 2, taken along line 3-3, with yet another component cover using indents and detents.
Figure 7B:
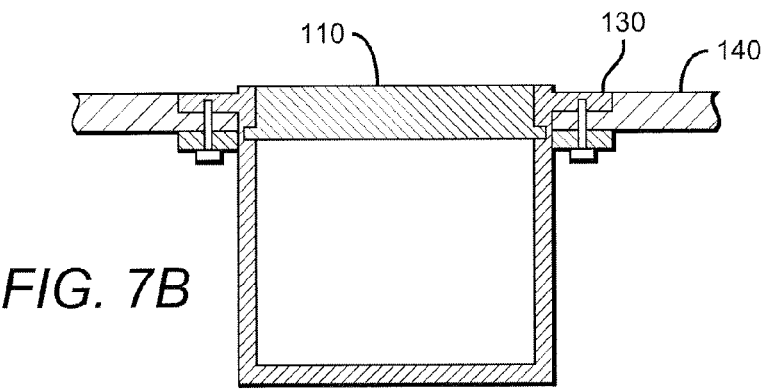
Figure 7C:
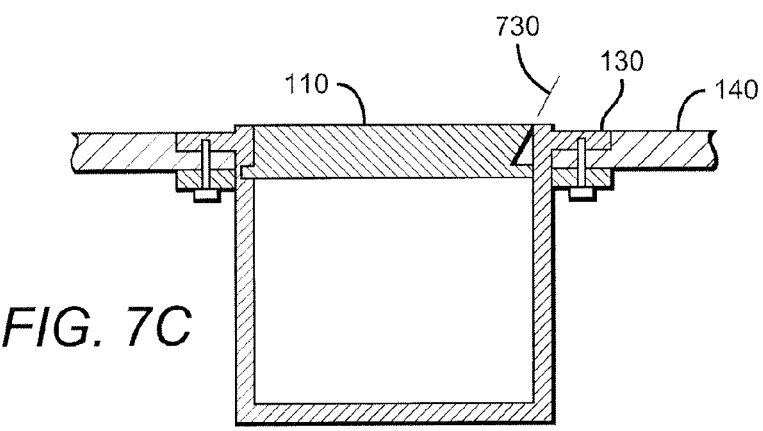

In FIGS. 7A-7C, an alternative indent/detent locking mechanism 700 generally comprises indents 710, 712 and detents 720, 722. Detent 722 is connected to a spring or is made of a compressible material that regains its shape after it is deformed. In this manner, an installer can merely insert detent 720 into indent 710, and then push component cover 110 into the recess. As component cover 110 is pushed into the recess, detent 722 compresses until it is adjacent to indent 712, at which point it snaps back into shape. An unlocking jimmy 730 or a similar device could then be inserted between detent 722 and the front bracket to compress detent 722 and remove component cover 110.

Many other suitable component cover locking mechanisms could also be used. The component cover locking mechanisms of FIGS. 3-7 have been provided for example only, and should not be considered the only methods to lock component covers into the recess.

Figure 8:
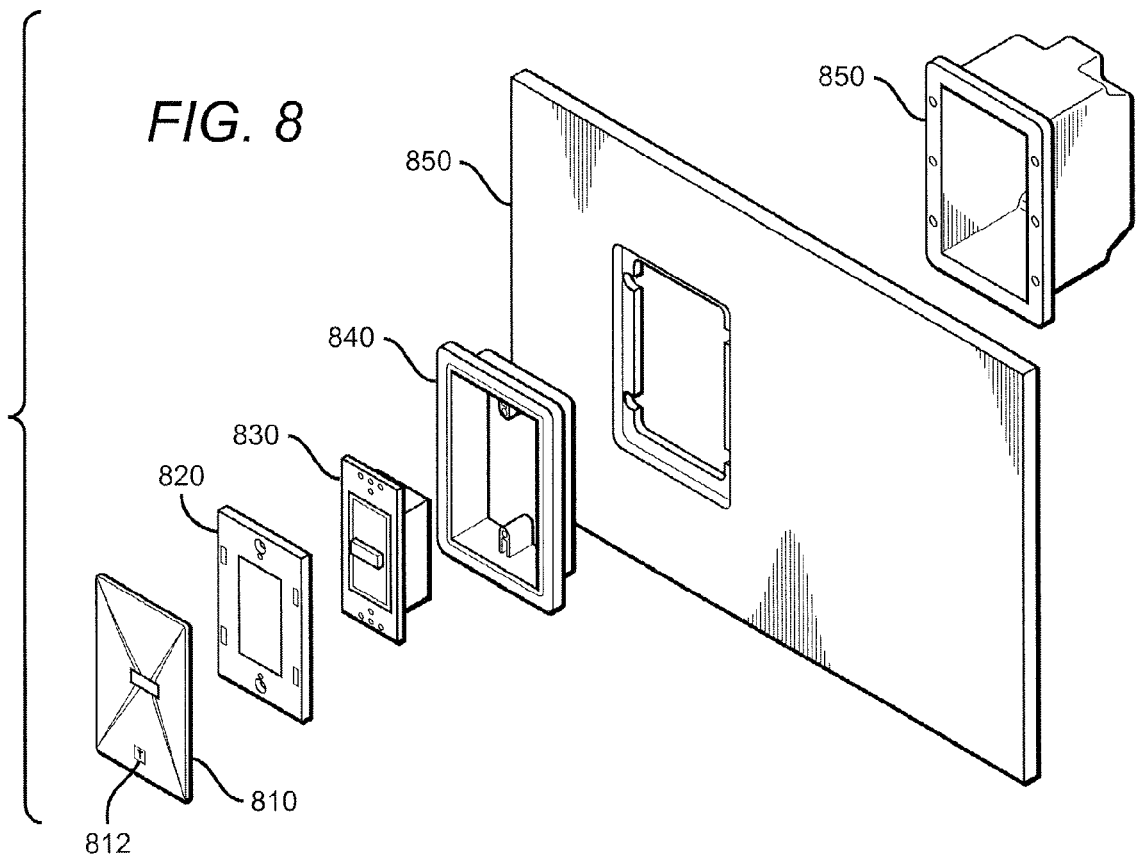
FIG. 8 is an exploded view of a panel, bracket, light switch, and component cover according to another embodiment.
Figure 10:
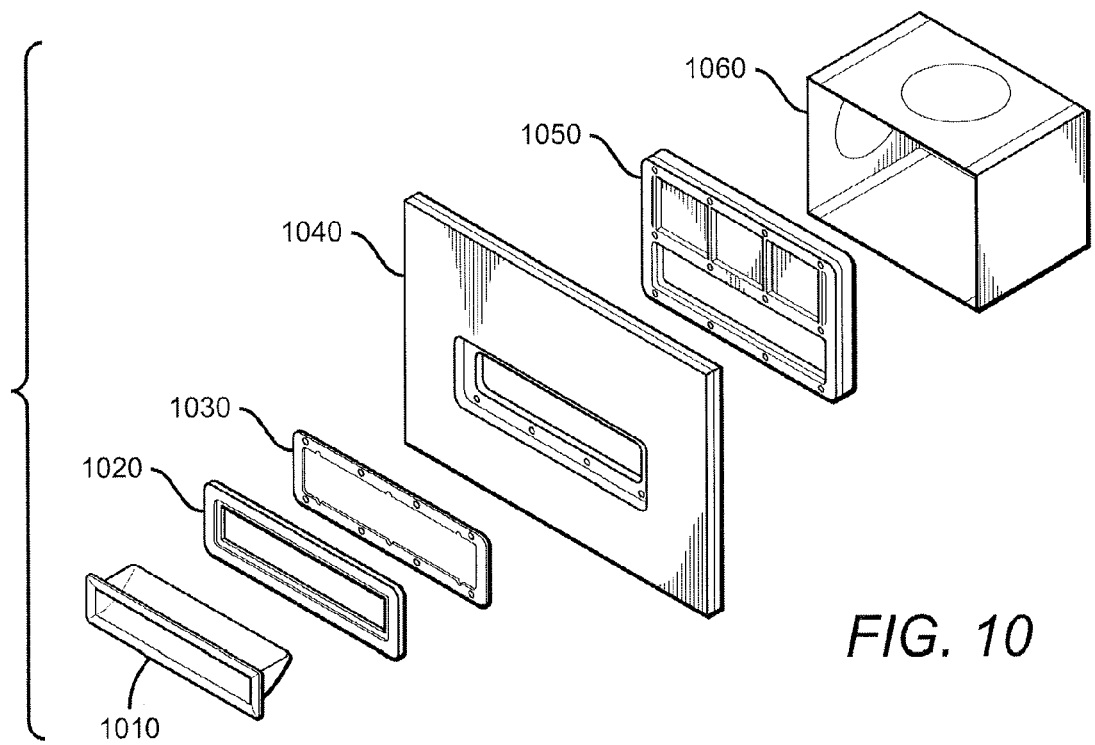
FIG. 10 is an exploded view of a panel, bracket, HVAC unit, and component cover according to another embodiment.
Figure 9:
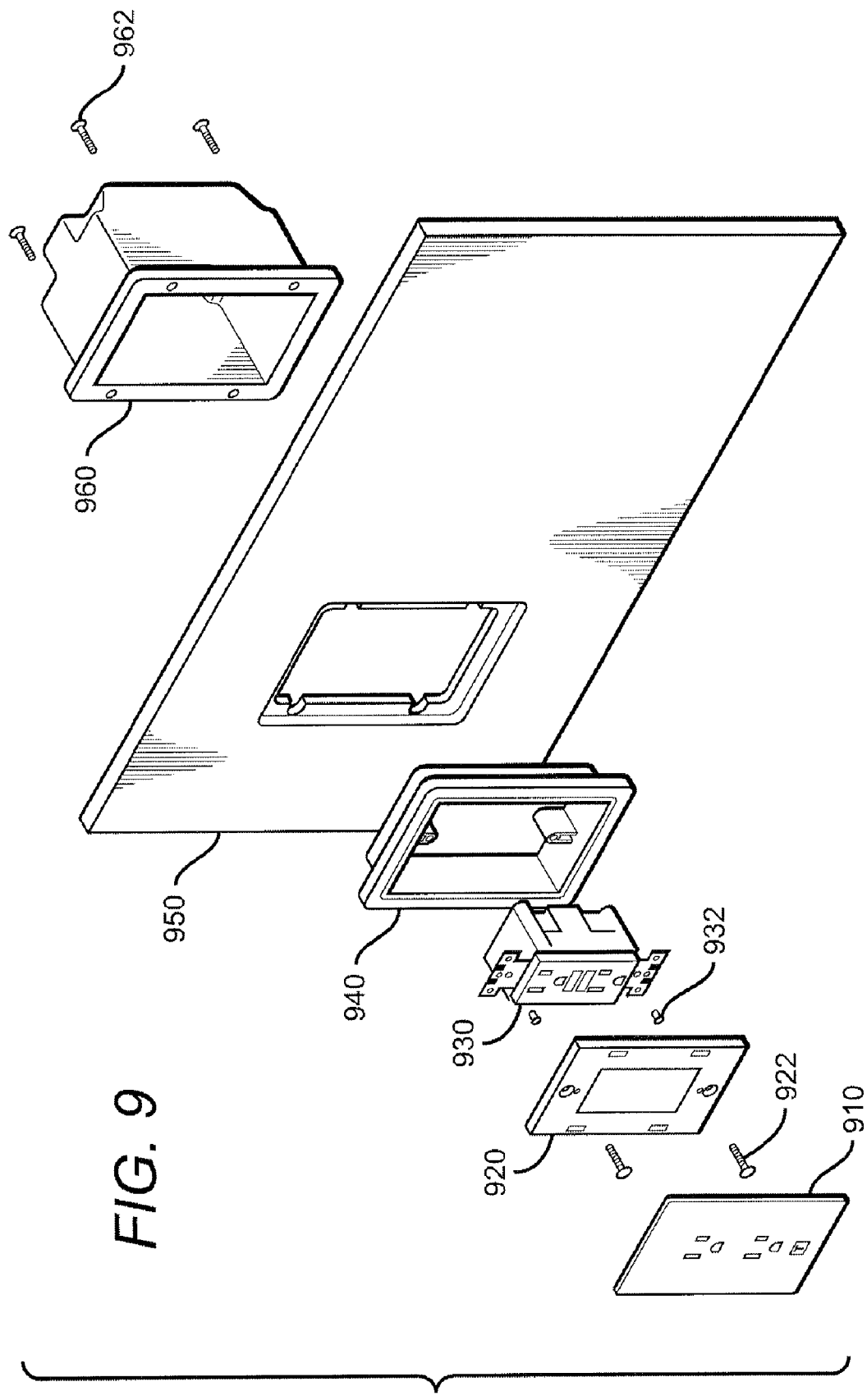
FIG. 9 is an exploded view of a panel, bracket, power outlet, and component cover according to another embodiment.

FIGS. 8-10 depict alternative panel assemblies that designed for specific components. FIG. 8 depicts an alternative panel assembly designed for a light switch with a component cover 810, a dust guard 820, a light switch 830, a front bracket 840, a panel 850, and a rear bracket 860. Rear bracket 860 receives light switch 830 instead of front bracket 840. Additionally, logo 812 is imprinted directly on component cover 810 so that a separate opening does not need to be opened in panel 850. Similarly, FIG. 9 depicts an alternative embodiment designed for a power outlet with a component cover 910, dust guard 920, power outlet 930, front bracket 940, panel 950, and rear bracket 960. Screws 922 are used to couple dust guard 920 to front bracket 940, screws 932 are used to couple power outlet 930 to front bracket 940, and screws 962 are used to couple rear bracket 960 to front bracket 940.

FIG. 10 depicts yet another alternative panel assembly designed for a heating, ventilating, and air conditioning (HVAC) unit (not shown), having a component cover 1010, front bracket 1020, spacer 1030, panel 1040, rear bracket 1050, and air vent 1060. Component cover 1010 acts as a vent for the HVAC unit (not shown), and is recessed within the opening of front bracket 1020, rear bracket 1050, and air vent 1060 to provide an air pathway from the air vent to the component cover. Neither bracket receives a component, since the HVAC unit is remote from the location of the vent.

Figure 11:
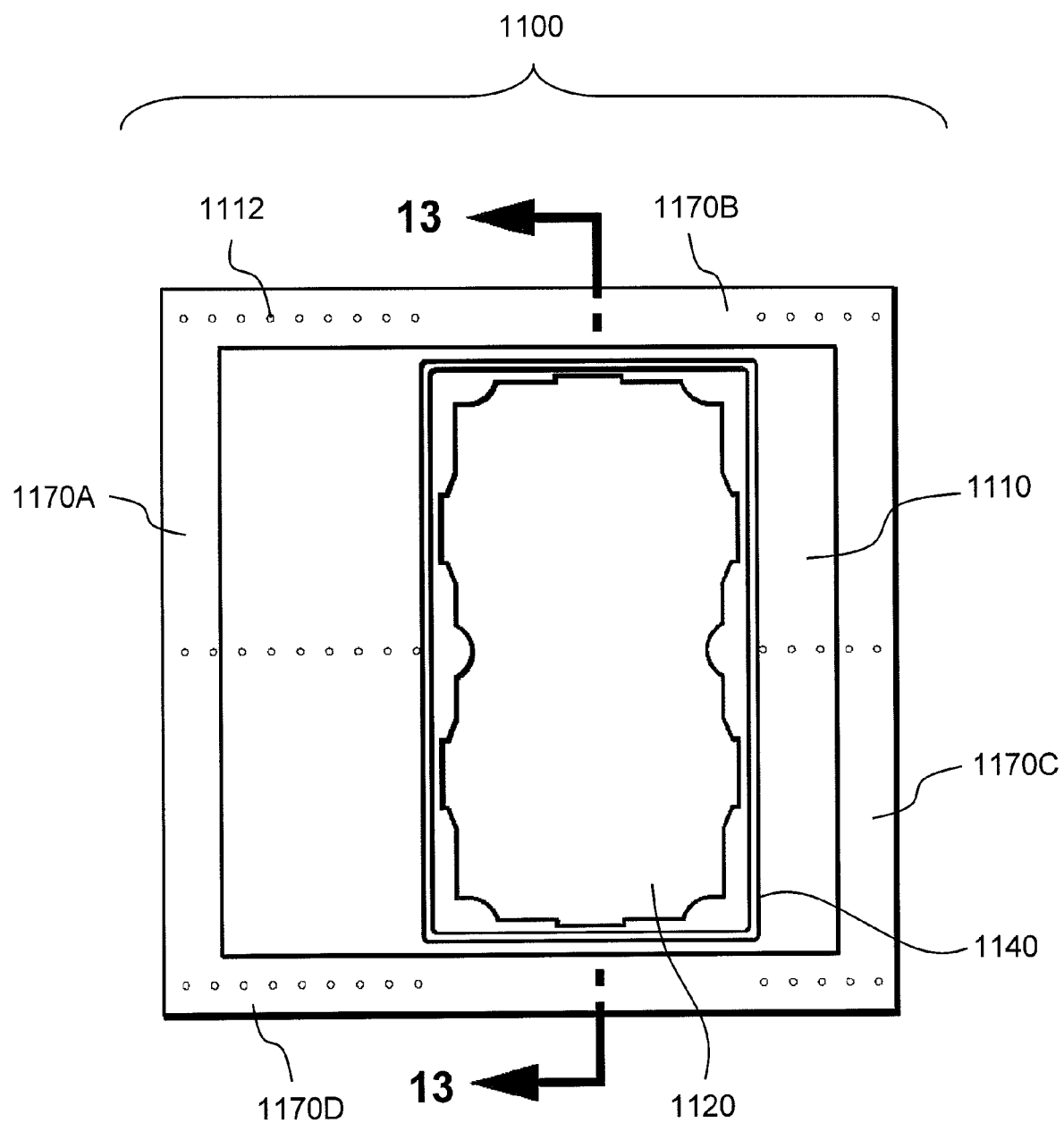
FIG. 11 is a plan view of a panel having an opening, and a receiver disposed in the opening.

In all of the embodiments, the bracket is preferably preinstalled in a panel that is then installed in a wallboard to provide better support for the component. In FIG. 11, a component mounting apparatus 1100 generally includes a panel 1110 with an opening 1120, and a bracket 1140 disposed in the opening 1120, and attachment wings 1170A-1170D. It should be appreciated that while each bracket is sized and dimensioned to hold a specific component, the brackets could be identical to one another to create a "universal bracketing system" that can hold components of various sizes.

Panel 1110 is similar to panel 140 in size, shape, dimension, and material. However, Panel 1110 also has hole primers 1112 to help panel 1110 mount to a wall or ceiling stud (not shown). Hole primers 1112 are spaced approximately 1 inch (2.5 cm) from center, a diameter of 0.375 in (9.525 mm), and are approximately ¼ in (6.35 mm) deep, but can be shaped and configured in other suitable ways. A "hole primer" is a concave hole deepest in the center that helps an installer drill a screw or hammer a nail in a designated place without slipping. The diameter of the hole primer is preferably larger than the diameter of the screw head or nail head used so as to prevent the head of the screw or nail from leaving an unsightly bump on the surface of the wallboard after spackling. Other suitable brackets are contemplated, for example visual marks or pre-drilled and threaded screw holes.

In some cases it may be desirable to include multiple openings for multiple components. Openings with varying height could be aligned along their top or bottom edges, aligned along a centerline, or could be arranged in a staircase fashion with a top edge aligned to a bottom edge. Openings could be cut at a job site or elsewhere by an installer, but are more conveniently precut (or molded to include the opening) at the manufacturer. It is possible for a panel to have punch out openings or perhaps cutout lines to facilitate selection of the position of the opening at the job site, but those options are currently disfavored relative to a manufactured pre-cut or molded opening and a relatively large panel.

The top, bottom, and side wings 1170A-1170D, respectively, preferably extend from the corresponding edges of the panel 1110 by at least about one inch (2.54 cm), which is deemed to be sufficient space to conveniently drive a nail or screw into a stud. It is also contemplated, however, that at least one of the wings 1170A-170D can extend much longer, perhaps 24 to 30 inches (about 60-75 cm) or more. Such long wings can accommodate odd installations where the studs are spread apart at a greater distance from each other than normal. Wings 1170A-1170D are preferably made of a metal mesh, but can include of any suitable material or materials so long as the material(s) provide(s) sufficient shear strength to support the panel 1110 and the component (not shown). Metal mesh is also desirable because the wings are advantageously relatively thin, so as not to push out the overlying wallboard, and metals can provide considerable strength with thickness of less than 100 mils. It should also be appreciated that although wings 1170A-1170D are described herein by separate numerals, they may well be one continuous piece of material.

Figure 12:
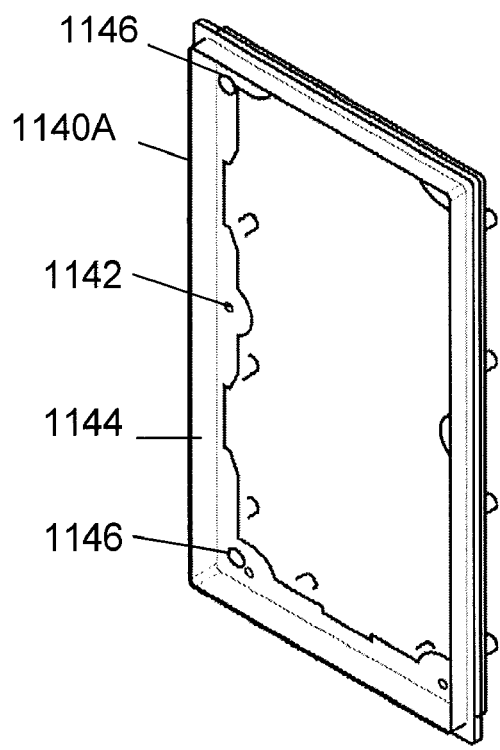
FIG. 12 is a front perspective view of the receiver in FIG. 11.

Bracket 1140 is preferably sized and dimensioned to fit snugly into opening 1120, but in any event is screwed, glued, clamped, or are otherwise securely attached to the panel 1110. The secure attachment is important since in at least some embodiments, the component housing will be attached to the bracket rather than being directly attached to the panel 1110. The bracket is preferably molded from polyethylene or other sufficiently strong and durable thermoset plastic. A front of bracket 1140 is shown in greater detail in FIG. 12, and includes holes 1142 for screws (not shown), a recess 1144 into which a component cover (not shown) can be removably secured via a holding mechanism, and a rim 1140A, and optional magnets 1146 or an optional press fit (not shown).

A spackle shield (not shown) preferably covers the opening of the bracket to prevent mud or drywall from splashing to the other side of the panel, and can be removed after spackling. This is particularly helpful for when an electronic component is pre-installed behind the panel before spackling. The spackle shield (not shown) can have optional level (not shown) to help ensure that the panel is being installed horizontally. Other devices that assist in installation can be provided in the spackle shield, for example a laser leveler to help align several panels with one another or a compartment that stores extra screws and magnets.

Figure 13A:
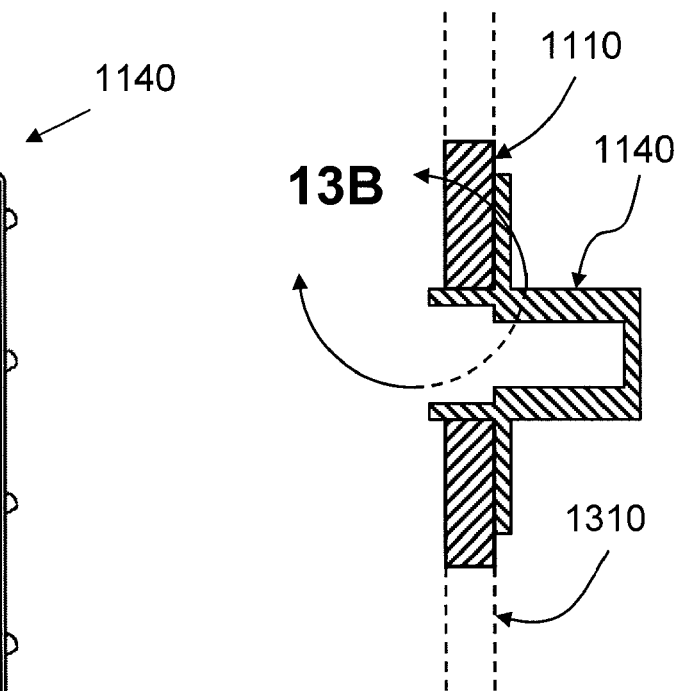
FIG. 13A is a simplified vertical cross-section of the panel of FIG. 11, taken along line 13-13, installed in a wallboard with an attached component.
Figure 13B:
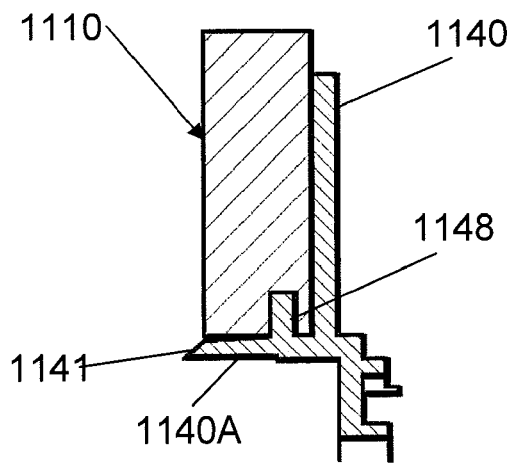
FIG. 13B is a blown up view of the circled portion of FIG. 13, taken along line 14-14.

FIG. 13A-B shows a side view of panel 1110 and bracket 1140. The rim 1140A is sized and dimensioned to extend outwardly beyond a front of the panel 1110 by a very small distance 1141, which provides a lip that can readily be used as a stop against which to spread a spackling compound, for example plaster or drywall. Preferred such distances 1141 are less than ⅛ inch, and preferably about 1/16 inch, or in metric terms about 1-3 mm. Preferably, the panel has a thickness of at least ¼ inch (6.35 mm). Also shown in FIG. 13B is an attachment member 1148 that helps secure bracket 1140 to panel 1110. A screw hole (not shown) can be provided in attachment member 1148 to help affix bracket 1140 to panel 1110.

It should be appreciated that the rim could be separable from the panel. Thus, for example, the rim could be a separately molded piece of plastic, metal or composite that is installed into the opening by the installer, or at a factory.

Figure 14:
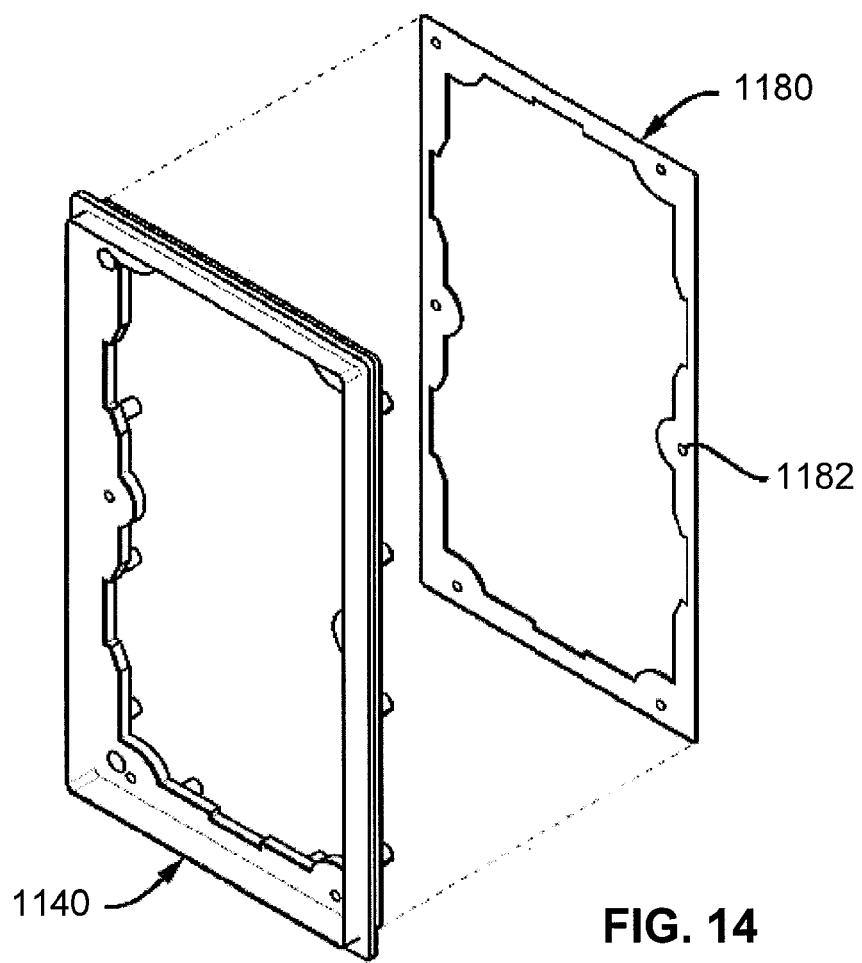
FIG. 14 is a front perspective view of the receiver of FIG. 12 positioned to couple with a bracket backing.
Figure 15:
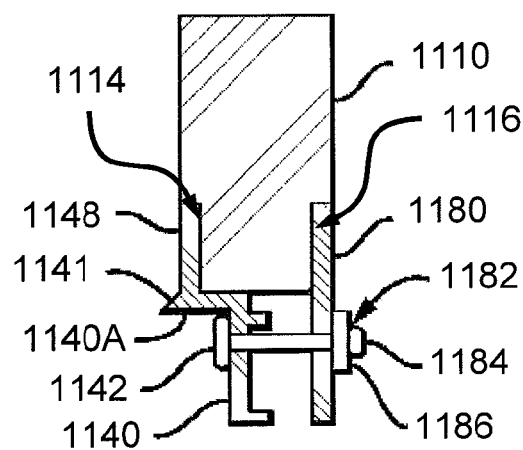
FIG. 15 is a blown up view of the circled portion of FIG. 13, taken along 14-14, with the bracket and bracket backing of FIG. 15.

As seen in FIGS. 14 and 15, a bracket backing 1180 with screw holes 1182 could be used to clamp bracket 1140 to panel 1110. In this embodiment, attachment member 1148 fits within recess 1114 on the front of panel 1110 and bracket backing 1180 fits within recess 1116 on the back of panel 1110. Screw 1184 threads through screw holes 1142 and 1182, and finally through nut 1186 to provide a clamping force around panel 1110. Clamping bracket 1140 to panel 1110 provides a secure connection without the need for expensive glues or adhesives.

Figure 16A:
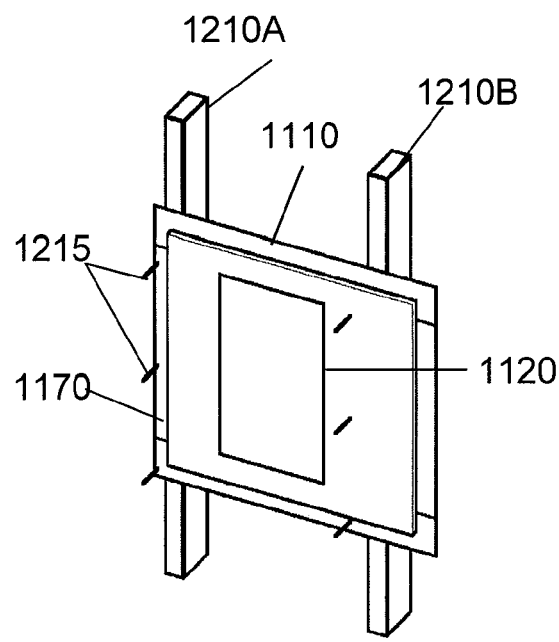
FIG. 16A is a front perspective view of a panel being affixed to two studs in a wall, the panel having a spackle shield covering the openings.

In FIG. 16A, the panel 1110 is affixed to two studs 1210A, 1210B in a wall, and screws 1215 are inserted through hole primers 1112 and the panel 1110 on the right side, and through attached flange 1170. Panel 1110 shows opening 1120 with a spackle shield covering the bracket. Of course, the positioning and orientation of the panel could be varied in any suitable manner with respect to the studs, 1210A, 1210B, including moving the panel 1110 higher or lower, left or right, or even tilting the panel clockwise or counterclockwise. Similarly, the studs should also be interpreted herein as emblematic of any support structures of a wall, whether or not such structures are technically considered to be studs. In addition, a greater or lesser number of screws could be used, or inserted in some other arrangement than that shown to provide greater or lesser support. The screws could also be replaced or supplemented by some other attachment means such as an adhesive.

Those skilled in the art will appreciate that the combination of panel and bracket could be provided in several different ways. The panel and bracket could, for example, be joined together at a job site, and indeed the panel could even be "manufactured" at the job site by cutting or punching out the opening. More preferably, however, the panel and bracket are provided as an item of manufacture to the installer by a supplier or manufacturer. The rim of the panel can be preinstalled to the panel. Thus, in various embodiments a kit could contain one or more of a panel, a bracket (or at least a rim around the edges of an opening in the panel), a speaker housing, a spackle shield, and installation screws. The installer would then provide whatever labor is appropriate for the installation, including optionally installing the bracket and/or rim, optionally installing the spackle shield, and optionally mounting the speaker into the speaker housing to the back side of the panel. It is also contemplated that the speaker can be pre-installed into the panel before installation. Alternatively the combination of the panel and bracket can be mounted before installing a rim on the opening.

Figure 16B:
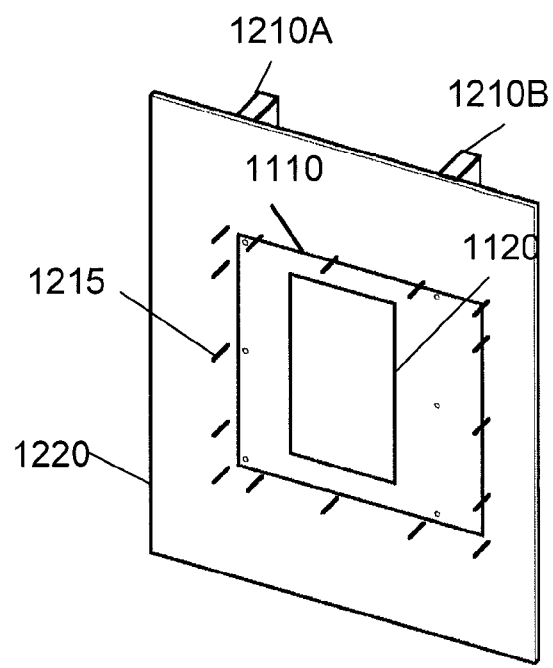
FIG. 16B is a front perspective view of the panel of FIG. 17A, around which drywall has been installed.

In FIG. 16B drywall 1220 or other wallboard has been installed on all four sides around the panel 1110, and coupled to the wings using screws 1215. Where wings are present, as in the embodiment depicted, the drywall 1220 overlays the wings, but the wings are sufficiently thin so that the drywall is not noticeable raised. Those skilled in the art will appreciate that although FIG. 16B shows the drywall 1220 surrounding the panel 1110 as a single piece. It is entirely possible that the drywall could comprise multiple pieces (not shown). It is also contemplated that installation of the drywall 1220 might be delegated to drywaller or other tradesman distinct from the panel installer. Nevertheless, the process of installing the panel on one or more wall supports is deemed to include the step of positioning the panel so that it can be approximated in an end-to-end fashion by a piece of wallboard or other wall section.

Figure 16C:
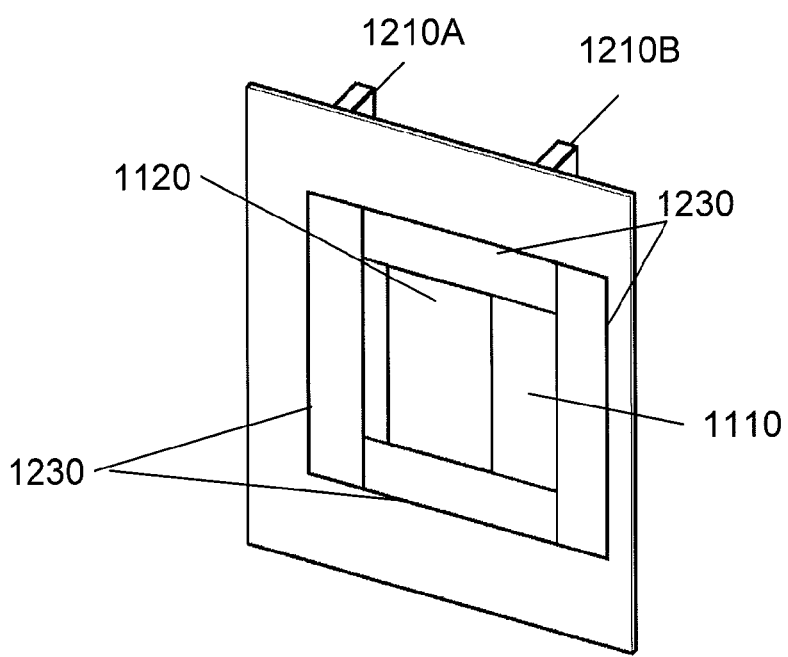
FIG. 16C is a front perspective view of the panel and drywall of FIG. 17B, showing mesh tape.

In FIG. 16C mesh tape 1230 is applied along the juxtapositions or other approximations between edges of the panel 1110 and edges of the drywall 1220. Here again, this step is usually delegated to a professional drywaller, but could be accomplished by the installer of the panel, regardless of which person actually does the work.

Figure 16D:
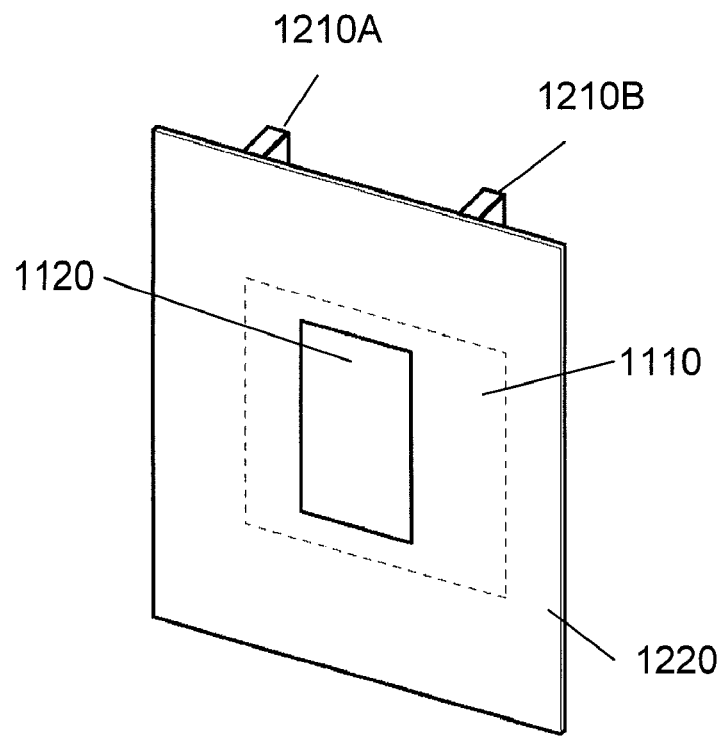
FIG. 16D is a front perspective view of the panel and drywall of FIG. 17C, where the mesh tape has been covered by spackle.
Figure 16E:
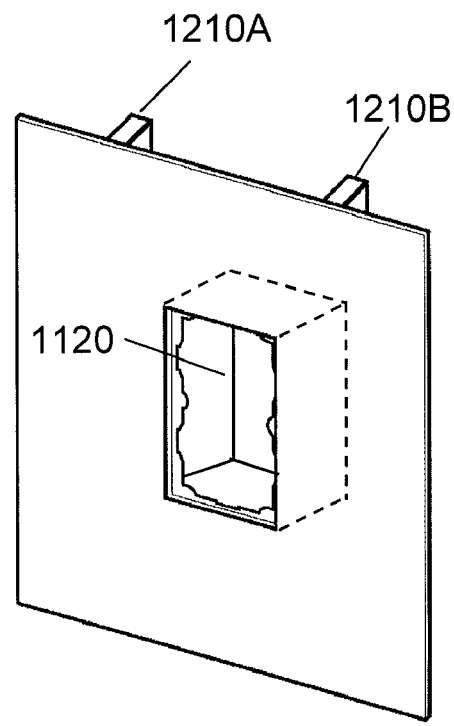
FIG. 16E is a front perspective view of the panel and drywall of FIG. 17C, where the spackle shields have been removed to show the openings.

In FIG. 16D the mesh tape is covered by a spackling compound, and is ready for painting, wallpapering, or other surface coating. Preferably, the spackling compound is smoothed over the entire front surface of the panel to the lips of opening 1120. As used herein, the terms "spackle" and "spackling" should be interpreted as broadly as possible, to include for example plaster and plastering of any type. One objective is to provide a smoothed out surface that completely or substantially hides the joints between edges of the panel and edges of the drywall In FIG. 16E, the spackle shield is removed from opening 1120 and a component can be installed in the new uniform wallboard 1220.

Figure 17A:
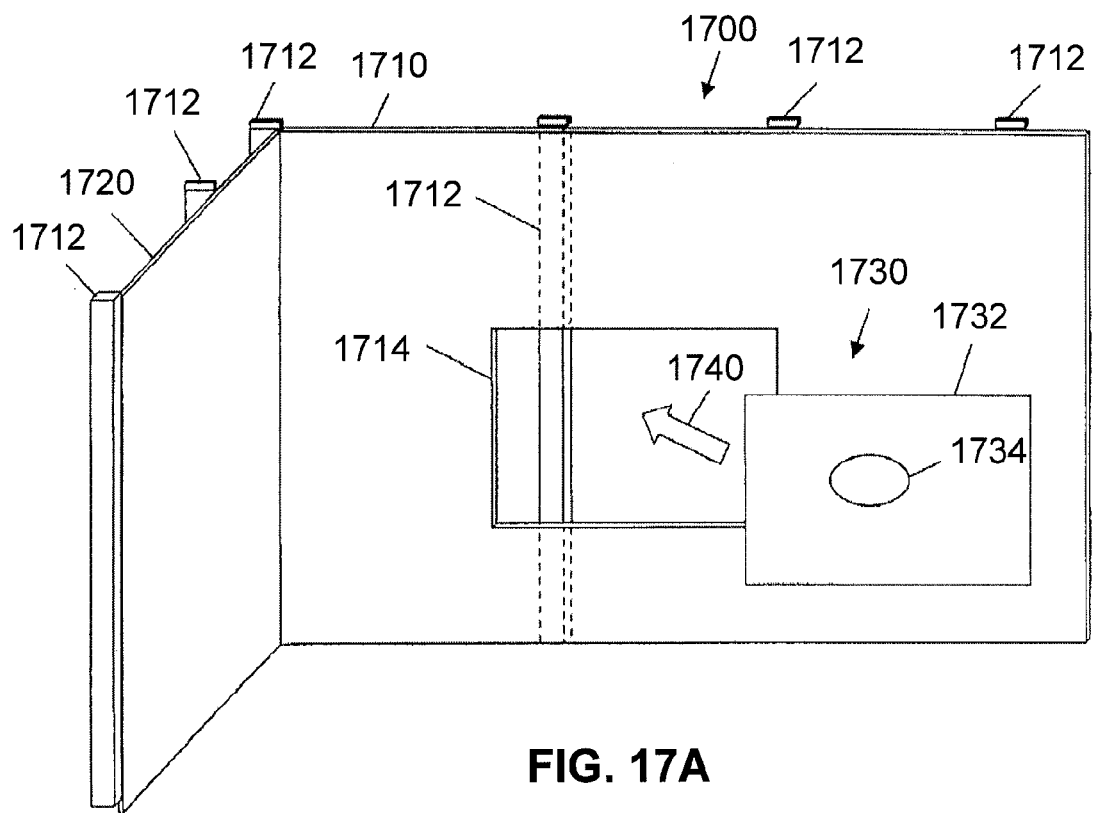
FIG. 17A is a perspective view of two structures in a building (e.g. walls or wall and ceiling), in which an opening has been cut to receive a panel assembly.

In FIG. 17A an installation 1700 generally includes wallboards 1710, 1720, an opening 1714 on structure 1710, and a panel assembly 1730 that will installed into the space 1714, as shown by arrow 1740.

Figure 18:
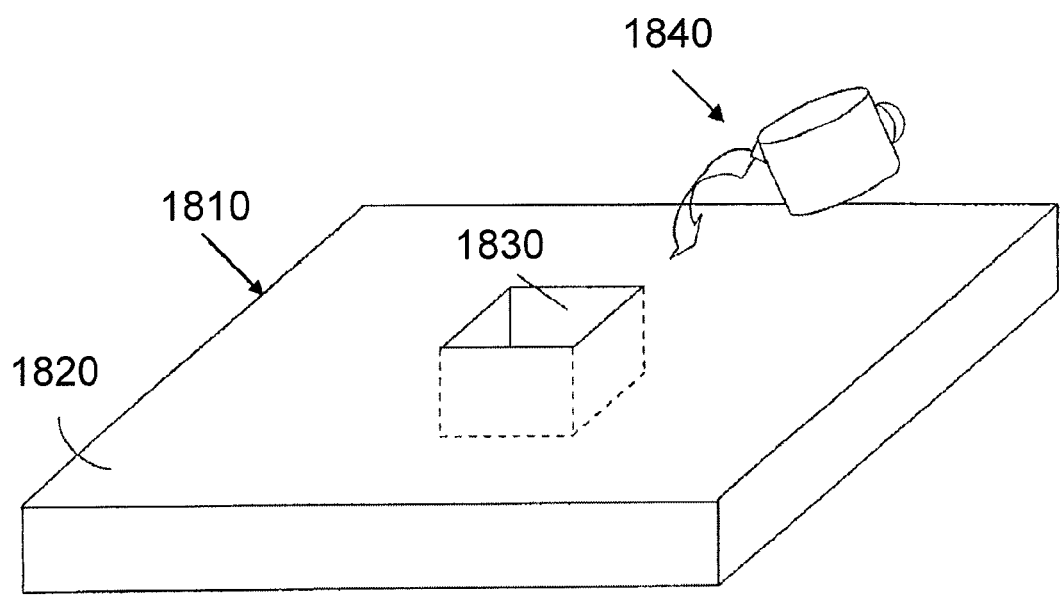
FIG. 18 is a perspective view of a panel assembly being formed by pouring a panel material into a mold.

As used herein, the term "assembly" means an object that has multiple components or functional portions. Thus, the term comprises: (a) multiple pieces that are coupled together in some manner, either temporarily or permanently; and also (b) a single molded object with multiple functional components. By way of example, panel assembly 1810 in FIG. 18 is a panel assembly molded as a single piece.

In typical installations, the wallboards 1710, 1720 would be adjacent vertical walls, or a vertical wall and a ceiling, and FIG. 17A should be interpreted to include all such embodiments. Thus, for example, where wallboards 1710, 1720 are interpreted to be vertical walls, members 1712, 1722 could be studs. Where wallboard 1710 is interpreted as a ceiling, members 1712 could be joists, and members 1722 could be horizontal struts. Although the portions of the wallboards 1710 and 1720 are depicted in the figure as substantially flat, those skilled in the art will appreciate that the structures could be curved, or have curved portions. In addition, those skilled in the art will appreciate that wallboard 1710 could exist independently of wallboard 1720.

Wallboards 1710, 1720 would typically comprise drywall, which term is used herein generically to include all manner of wallboard, fiberboard, gypsum board, GWB, plasterboard, Sheetrock® and Gyproc®, and so forth. Additionally or alternatively, wallboards 1710, 1720 could comprise other materials, including for example polymers, masonry, ceramics, and acoustic ceiling tile materials or other composites.

Wallboards 1710, 1720 can have any suitable dimensions, from only a few square feet or less, to hundreds of square feet or more. Wallboards 1710, 1720 will usually, however, have relatively small thicknesses of between ¼" and 1" in thickness.

Panel assembly 1730 can be produced at a job site, for example, by cutting a hole out of a piece of drywall. The piece being used in such instances can be cut out from an existing vertical wall or ceiling, and or can be completely new to the job site. Either of those methods could work adequately for drywall, acoustic ceiling tile and other materials that are fairly easy to cut, but for difficult to cut materials, including for example polymers, masonry, and ceramics, the panel assembly can be most conveniently produced in a factory where the panel is dried or cured around a form (see FIG. 18) to define the opening.

As discussed above with respect to FIGS. 11-16, the opening 1734 of FIG. 17A can be any suitable size, shape, or number. As currently contemplated, it is desirable that the total front facing area consumed by the opening be relatively small with respect to that of the panel 1732. That ratio is preferably at least 3, more preferably at least five. Viewed from another perspective, it is preferred that the panel 1732 extend in at least one direction at least 3 inches (7.62 cm) from the closest edge of the opening 1734 for light or other simple switches, electrical outlets and so forth, and at least 5 inches (12.7 cm) for lights, more complicated switches and other controllers, speakers and so forth. Where the component has a front-facing surface area of at least 25 in$^2$ (about 160 cm$^2$), the panel 1732 extends in at least one direction at least 12, 117, or even 24 inches (about 30, 45, or 60 cm) from the closest edge of the opening 1734.

Figure 17B:
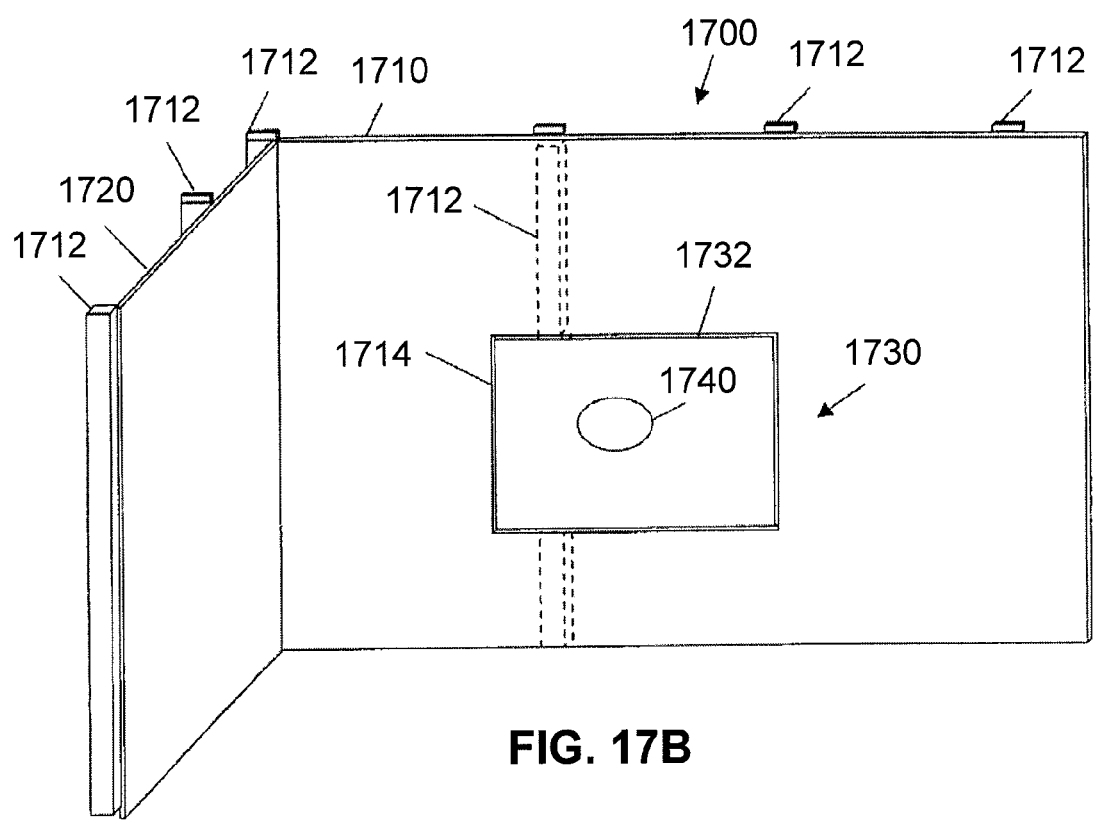
FIG. 17B is a perspective view of the two structures of FIG. 18A, in which the panel assembly has been placed within the opening.

In FIG. 17B the panel assembly 1730 has been placed within the space 1714. There will almost always be some gap between the edges of the panel assembly 1730 and those of the surrounding structural component 1710, ranging in typical installations from zero (where the panel assembly 1730 is abutted against the structural component 1710), and perhaps ⅟₁₇" (3.175 mm) to ¼" (6.35 mm). Indeed, there will almost always be multiple different gaps around the edge of the panel assembly. Where the workmanship is sloppy, or the project is especially difficult, the gap in some sections can be larger. In addition, it is contemplated that an intermediate member (not shown), as for example a paper, shim, or even a frame can be installed in the gap between the panel assembly 1730 and the structural component 1710. As long as the edges of the assembly and the wallboard are somewhat near each other, and the gap can be finished and concealed such that an at least superficially continuous junction is established between them, the edges are considered to be approximated.

Figure 17C:
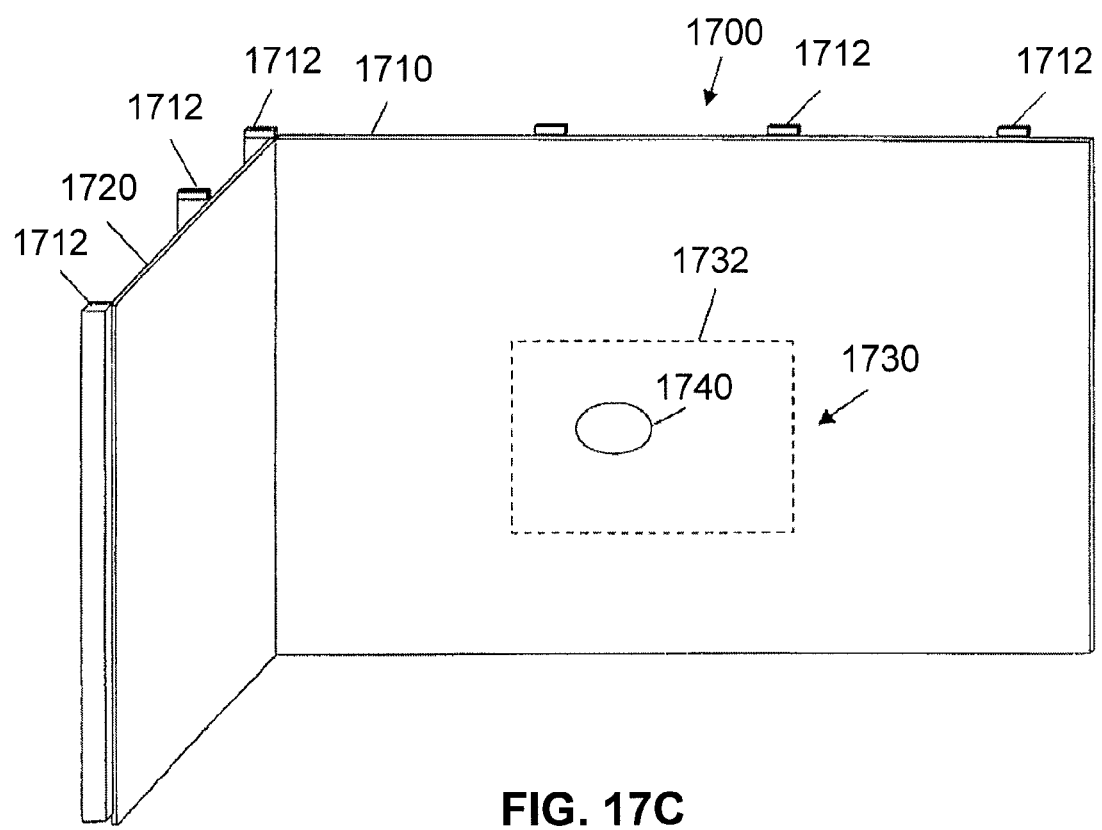
FIG. 17C is a perspective view of the two structures of FIG. 18B, in which the approximated edges of the panel assembly and the wall have been finished to provide a superficially continuous junction.

In FIG. 17C the approximated edges of the panel assembly and the wallboard have been finished to provide an at least superficially continuous junction. As used herein the term "at least superficially continuous junction" refers to a junction that appears to casual observation to be seamless. By way of example, a good workman-like job in taping and plastering adjacent sections of wall board is considered herein to produce an at least superficially continuous junction, especially where subsequent painting or wallpapering eliminates any seam apparent to casual observation.

FIG. 18 is a perspective view of a panel assembly 1810 being formed by pouring a panel material from container 1840 into a mold 1820. This process brings the poured material right up against the frame portion that defines the opening 1830, regardless of any irregularity or other difficulties with the shape of the opening. All manner of panel materials are contemplated, including for example curable plastics, and masonry composites.

Thus, specific embodiments and applications of installing components to a wallboard so that the component cover rests in a recess formed in the wallboard have been disclosed. It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of installing a component to a wallboard, comprising:
   disposing the panel within an opening in the wallboard and coupling the panel to the wallboard such that a front side of the panel is substantially flush with a front side of the wallboard;
   disposing the component within an opening in a panel and coupling the component to the panel, such that a front side of the component is recessed from the front side of the panel to form a cover recess; and
   disposing a component cover within the cover recess to overlay at least a portion of the component, such that a front side of the component cover is substantially flush with the front side of the panel.

2. The method of claim 1, further comprising disposing a bracket within the opening in the panel, and coupling the component to the bracket.

3. The method of claim 2, further comprising engaging a locking mechanism to lock the component cover to the bracket.

4. The method of claim 3, wherein the step of engaging the locking mechanism comprises disposing the component cover into the component recess such that a first magnet attractor coupled to the component cover is attracted to a second magnet attractor coupled to the bracket, wherein at least one of the first magnet attractor and the second magnet attractor is a magnet.

5. The method of claim 1, further comprising establishing an at least superficially continuous junction between an edge of the panel and an edge of the wallboard by at least one of taping and plastering over the junction.

6. The method of claim 1, wherein the step of coupling the panel to the wallboard includes coupling the panel to a support stud behind the wallboard.

7. The method of claim 1, further comprising coupling the component cover directly to the component.

8. The method of claim 1, further comprising magnetically coupling the component cover and the component.

9. The method of claim 1, further comprising replacing the component cover with a second component cover, wherein the second component cover has a different physical configuration than the first component cover.

10. A system for installing a wall-mounted component to a wallboard, comprising:
    a panel that at some point in time has an opening;
    an attachment mechanism that couples the panel to an opening in the wallboard such that a front side of the panel is substantially flush with a front side of the wallboard;
    a component sized and dimensioned to fit within the opening, such that a front of the component is recessed from the front surface of the panel to form a recess; and
    a component cover that fits in the recess formed by the component and the panel to cover at least a portion of the component.

11. The system of claim 10, wherein a front of the component cover is flush with a front of the panel.

12. The system of claim 10, further comprising a first magnet attractor coupled to the component cover and a second magnet attractor coupled to the component cover, wherein at least one of the first magnet attractor and the second magnet attractor is a magnet.

13. The system of claim 10, further comprising a bracket that holds the component within the opening.

14. The system of claim 10, wherein the component cover comprises a visible logo.

15. The system of claim 10, further comprising a locking mechanism that prevents the component cover from being removed from the recess.

16. The system of claim 15, wherein the locking mechanism automatically locks as the component cover is placed within the recess.

* * * * *